United States Patent [19]

Bauchot et al.

[11] Patent Number: 5,644,576

[45] Date of Patent: Jul. 1, 1997

[54] MEDIUM ACCESS CONTROL SCHEME FOR WIRELESS LAN USING A VARIABLE LENGTH INTERLEAVED TIME DIVISION FRAME

[75] Inventors: Frederic Jacques Bauchot, St. Jeannet; Frederic Bernard Lefevre, Cagnes sur Mer; Luc Louis Revardel, La Gaude, all of France

[73] Assignee: International Business Machines Corporation, Armonk, N.Y.

[21] Appl. No.: 442,424

[22] Filed: May 16, 1995

[30] Foreign Application Priority Data

Oct. 26, 1994 [EP] European Pat. Off. ............... 94480111

[51] Int. Cl.$^6$ ............................................ H04J 3/16
[52] U.S. Cl. .................... 370/437; 370/465; 370/337; 375/202
[58] Field of Search ........................ 370/79, 95.3, 85.2, 370/18, 95.1, 437, 465, 445, 431, 458, 522, 337; 375/202, 203, 200

[56] References Cited

U.S. PATENT DOCUMENTS

| 4,907,224 | 3/1990 | Scoles et al. | 370/85.2 |
|---|---|---|---|
| 5,123,029 | 6/1992 | Bantz et al. | 375/202 |
| 5,142,534 | 8/1992 | Simpson et al. | 370/95.1 |
| 5,241,542 | 8/1993 | Natarajan et al. | 370/85.2 |
| 5,384,777 | 1/1995 | Ahmadi et al. | 370/85.2 |

FOREIGN PATENT DOCUMENTS

| 2115211 | 10/1994 | Canada | H04B 7/24 |

OTHER PUBLICATIONS

Anthony S. Acampora and Jack H. Winters "Wireless Network for Wide-band Indoor Communications," IEEE Journal on Selected Areas in Communication, vol. sac-5, No. 5 (Jun. 1987).

Primary Examiner—Douglas W. Olms
Assistant Examiner—Shick Hom
Attorney, Agent, or Firm—Stephen T. Keohane; John D. Flynn

[57] ABSTRACT

A Medium Access (MAC) Protocol is utilized for wireless access, preferably over a radio frequency channel, for a plurality of remote stations to a base station on a LAN. The MAC protocol is based on a reservation scheme for user data traffic and a random access technique for control and signalling traffic. There is a time division frame structure in which time is slotted. Time slots are grouped into variable length periods. The variable frame structure consists of a frame header followed by interleaved periods of different types (type A, B or C). Type A periods are allocated to the outbound channel which is used for data transfer from the base station to the remote stations. Type B periods, are allocated to the inbound channel that is used for contention-free data transfer from the remote stations to the base station. Allocation of the data slots in the A and B periods is performed by the base station. Type C periods are reserved to the control channel used for transmission of reservation requests and data from the remote stations to the base station in a random-access contention mode using a slotted Aloha protocol. The duration and sequence of periods may be varied by using a technique for interleaving periods of different types. The base station estimates the number of actively transmitting remote stations utilizing feedback information from the remote stations. This estimate is broadcast to the remote stations as control indicia to control their transmission attempts in C slots, thus yielding high transmission efficiency.

35 Claims, 12 Drawing Sheets

FIG. 1
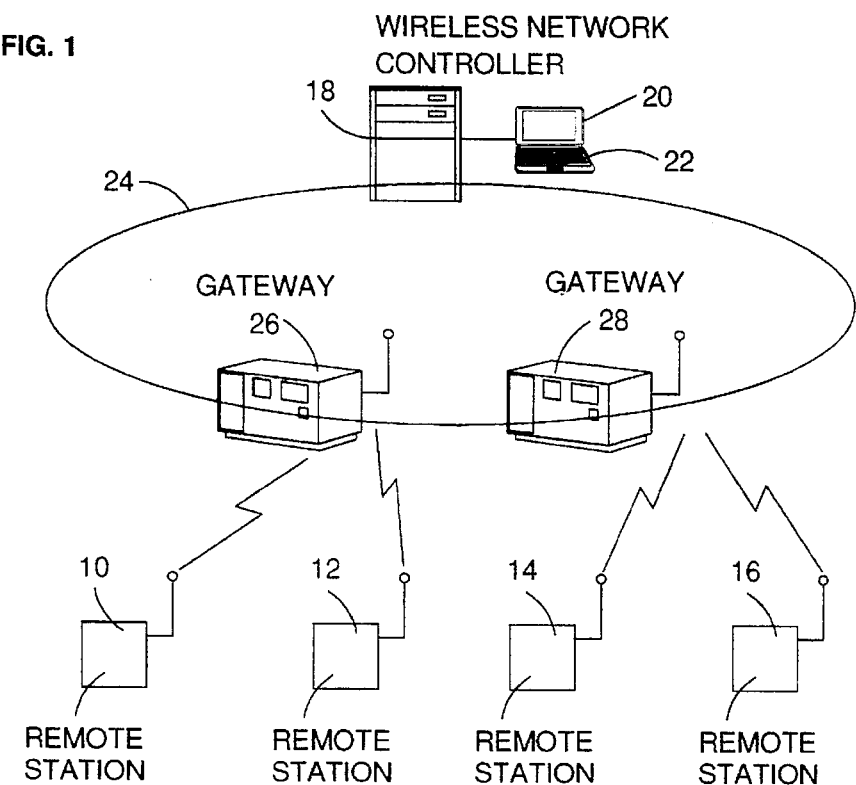
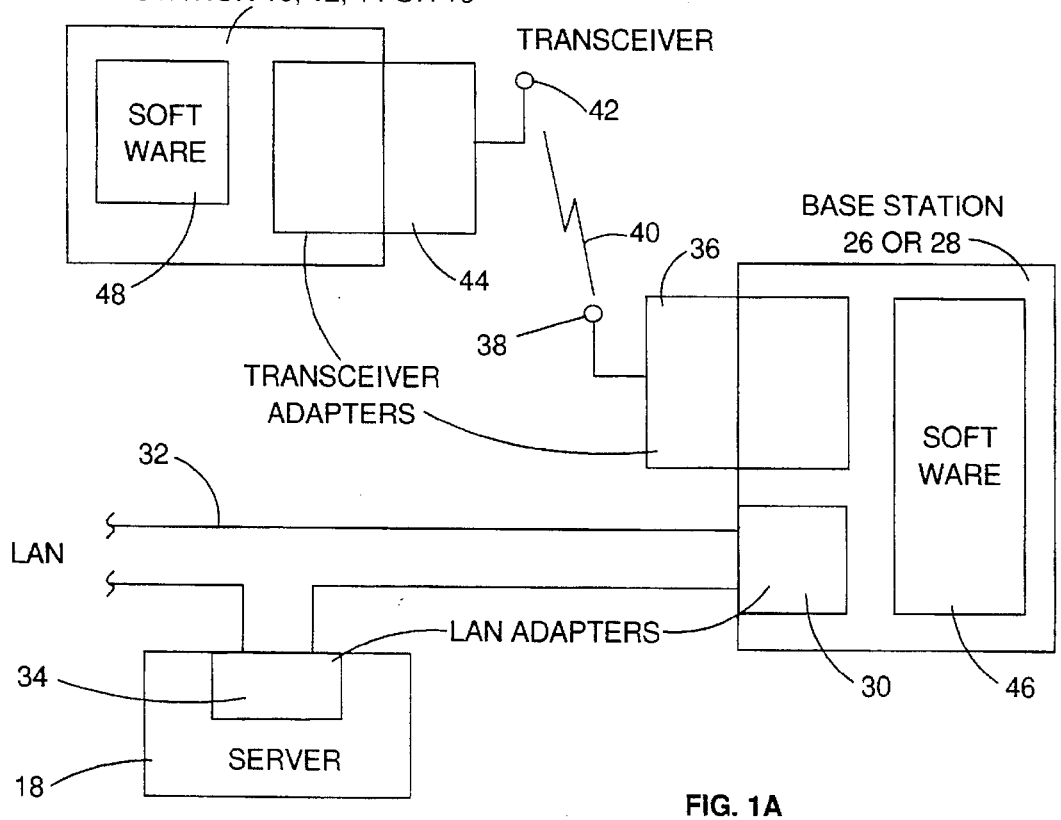
FIG. 1A

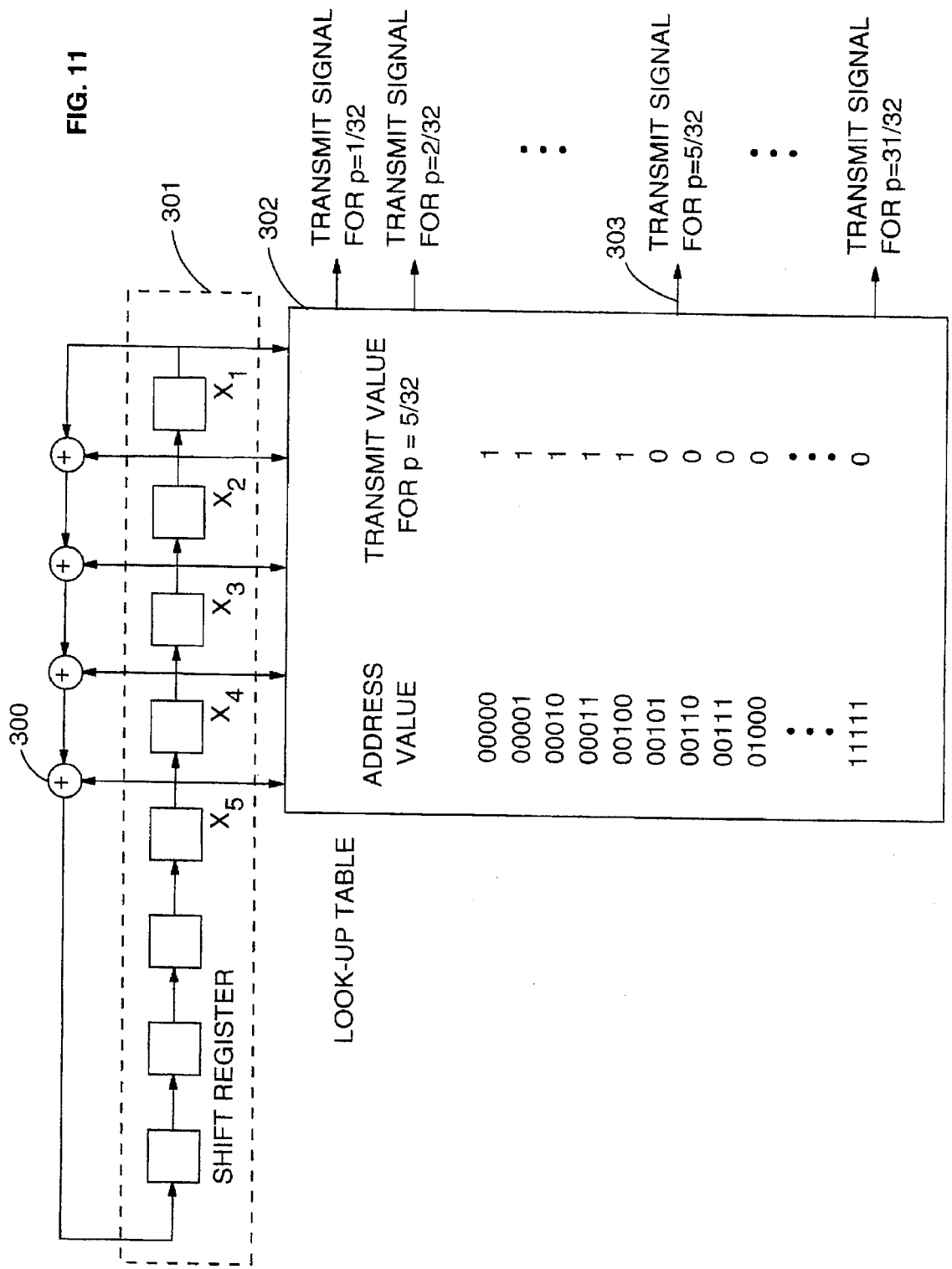

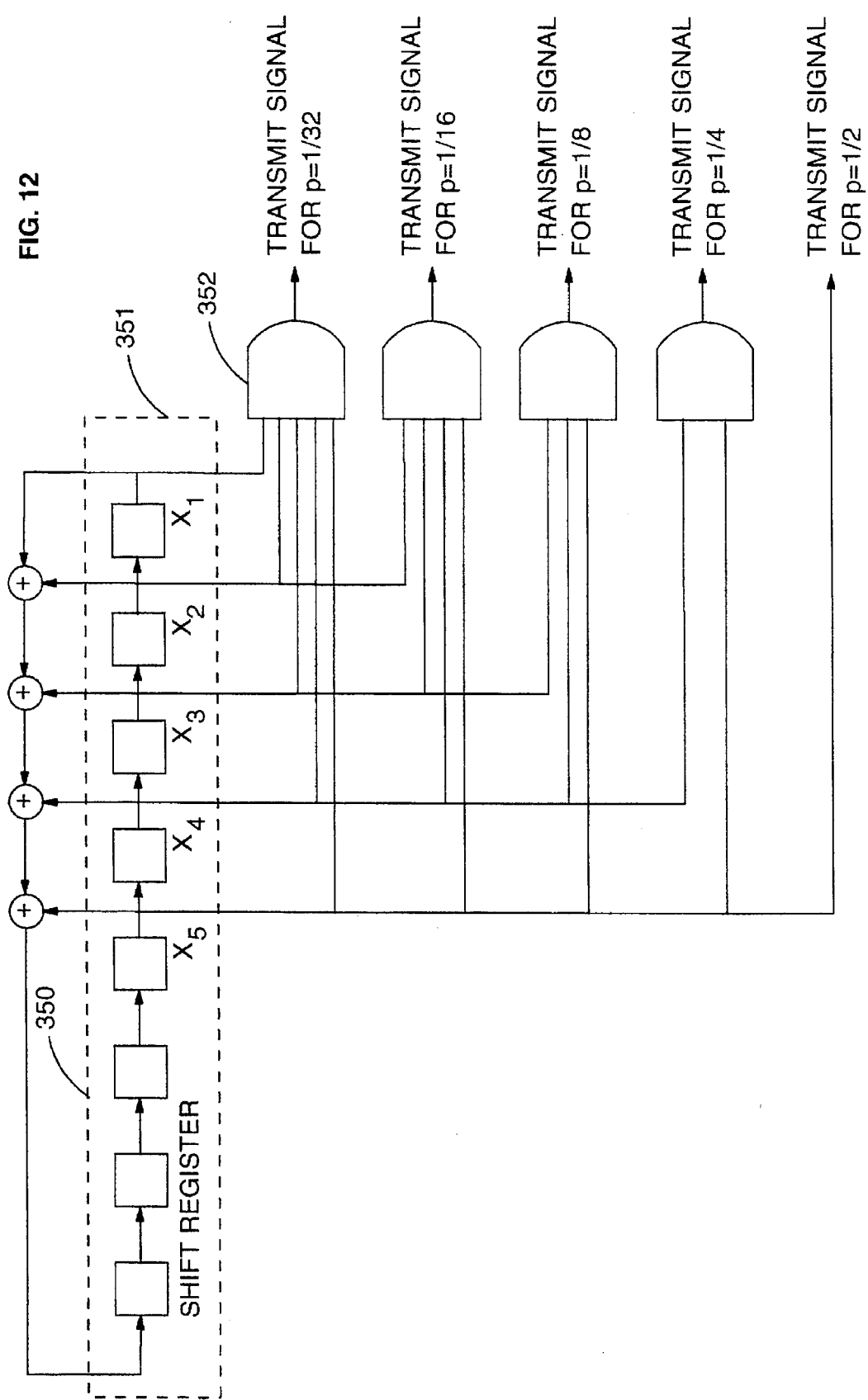

MEDIUM ACCESS CONTROL SCHEME FOR WIRELESS LAN USING A VARIABLE LENGTH INTERLEAVED TIME DIVISION FRAME

FIELD OF THE INVENTION

This invention relates generally to data communications, and in particular such communications in a Local Area Network (LAN). Specifically, the invention is directed to a Medium Access Control (MAC) protocol for wireless access to a LAN.

BACKGROUND OF THE INVENTION

The need for personal wireless communications is expanding rapidly with the advances in digital communications and personal communications systems. The progress in cellular radio technology and the growth rate of the cellular telephone systems over the last several years is indicative of tremendous market demand for location independent communication via wireless access. Many of the current wireless networks architectures are primarily designed and optimized for voice communications and wide area coverage. With the proliferation of personal and portable computers, and local area networks, it is envisioned that data services and applications such as file server access, client-server execution, and electronic mail will require wireless access to the LAN environment supporting distributed computing. Since the characteristics and profile of data traffic are very different from those of voice traffic, the wireless access protocol must efficiently accommodate the very dynamic and bursty nature of data traffic.

U.S. Pat. No. 5,142,534 to Simpson et al. discloses a voice-data communication system having a base network control unit coupled to a plurality of fixed transceivers for providing communications to a plurality of portable sets. The system employs frequency hopping, time division multiplexing and demand assigned multiple access. Frequency hopping radio signals include a first set of adjacent data receiving slots, a second set of adjacent data transmitting slots and a midamble slot placed between the first and second slots. The midamble includes information for system control and signalling information used for instance for portable set registration or synchronization.

U.S. Pat. No. 5,123,029 to Bantz et al discloses a hybrid controlled access and random access scheme using frequency hopping spread spectrum communication techniques implemented in an indoor digital data radio communication system between remote stations and a computer system. A hop in the frequency hopping spread spectrum communication system is subdivided into two intervals so that different media-access protocols can be used in each interval. The protocol uses a centralized control scheme in one interval and a decentralized scheme in the other, and the intervals may be varied depending on the load of the system.

U.S. Pat. No. 4,907,224 to Scoles et al discloses a method for transmitting data in packet switching networks which provides a Collision-Eliminating Multiple Access protocol in which nodes desiring to transmit over the network channel transmit reservation requests during a plurality of contention slots, the number of contention slots being dynamically controlled according to network load. A node designated to next obtain control of the channel receives the identifiers of nodes transmitting reservation requests and, prior to transmitting application data, transmits network control data consisting of the identifiers of nodes from whom reservation requests were successfully received. The transmitted identifiers are received and stored by each node in an identical queue whereby subsequent control of the channel is rotated based on the order of node identifiers appearing on each node. The transmitted network control data includes reservation requests received during a previous contention slot period, queue correction information, and the identifiers of nodes from which the controlling node expects to receive data.

L. G. Roberts, "Dynamic Allocation of satellite capacity through packet reservation", Nat. Comput. Conf. AFIPS Conf. Proc. Vol. 42, pp. 711–716, June 1973, describes a proposal for a MAC protocol based on a reservation scheme for user data traffic and a contention scheme for making reservations.

According to the present invention, an adaptive and efficient Medium Access Control (MAC) TDMA protocol for wireless access in a local area environment is capable of supporting both bursty data traffic and synchronous services such as voice and video. Commonly used TDMA based protocol are characterized by performance limitations for sustained inbound traffic due to built-in protocol latency. The present invention overcomes such limitations by using a variable length time division frame structure with inbound and outbound traffic interleaving. A packet-switched architecture is utilized in which several remote stations within a given cell (small cells covering a range of a few hundred meters) communicate with a base station using radio channels, which can be connected to a fixed local area network. Remote stations can operate both indoor and outdoor with limited range and have wireless access to the base stations on the backbone network. As an example, consider the environment of an industrial campus consisting of several office buildings. The buildings are divided into cells, and cells are connected via some backbone network such as wired LAN. This invention addresses the intra-cell multiple access problem. The basic problem here is how to coordinate the wireless channel bandwidth which is shared by all remote stations within a cell in a fair, flexible demand-driven manner and achieve a high throughput.

SUMMARY OF THE INVENTION

A Medium Access Control (MAC) Protocol for access over a shared multiple access communication channel for a plurality of remote stations to a base station on a LAN is disclosed. The preferred embodiment of the description uses a radio frequency (RF) spread spectrum communication channel and more particularly a slow frequency hopping RF channel. However the same MAC protocol can be used for any other multiple access shared medium such as a radio frequency and or an infrared (IR) channel. The MAC protocol is based on a reservation scheme for user data traffic and a random access technique for control and signaling traffic. There is a variable length time division frame structure in which time is slotted using different types of time slots, A, B and C. Type A time slots are used for the outbound channel which is used for data transfer from the base station to the remote stations. Type B time slots are used for the inbound channel that is used for contention-free data transfer from the remote stations to the base station. Type C time slots are used for a random access channel for the transmission of reservation requests and data from the remote stations in a random-access contention mode using a slotted Aloha protocol. In a preferred embodiment of the invention type C slots are dedicated exclusively to transmission from remote stations to the base station. The base station sets the structure of the variable length frame structure by adjusting the number of time slots for each type A, B and C and by interleaving sequences of time slots of the same type (A, B or C) designated as respectively type A, type B or type C periods, according to traffic conditions. Interleaving periods of different types significantly reduces protocol latency. The base station performs allocation of type A, B and C periods and estimates the number of actively transmitting remote stations utilizing feedback information from the remote stations. This estimate is broadcasted to the remote stations as control indicia to control their transmission attempts in the C time slots, thus yielding high transmission efficiency.

More generally the invention relates to a method and an apparatus for a medium access control (MAC) scheme in a digital communication system, of the type comprising a plurality of remote stations, each including a transceiver for communication over a shared medium, a base station having a transceiver for communication over said shared medium with the transceivers of each of said plurality of remote stations, said method including the steps of defining a sequence of time frames during which messages and data are transmitted over said shared medium, each said time frame being divided into at least three types (A, B, C) of time slots, type A time slot for outbound transmission from said base station to said plurality of remote stations, type B time slots for contention free inbound transmission from said plurality of remote stations to said base station and type C time slots for contention access by said plurality of remote stations for transmission over said shared medium. The method of the invention comprises the steps of:

allocating in a given time frame a variable number of said type A, type B and type C slots; and interleaving within said given time frame groups of consecutive slots of the same type and optionally inserting type C slots after each group of consecutive slots of the same type (A or B).

inserting type C slots at the end of said given time frame. When the base station's and remote stations' transceivers use frequency hopping radio signalling over a radio frequency channel the method includes the step of spilling a given time frame over one or more frequency hopping periods and inserting for that purpose in given time frame time slots for frequency hopping.

BRIEF DESCRIPTION OF THE DRAWINGS

FIG. 1 is a pictorial diagram showing an indoor radio digital data communication system of the type in which the invention is implemented;

FIG. 1A is a block diagram of the system shown in FIG. 1 illustrating the basic components of a remote station and a base station;

FIGS. 11 and 12 are each schematic diagrams of a Bernoulli random variable generator as used in the practice of the invention.

DESCRIPTION OF THE INVENTION

A medium access control (MAC) protocol is described that is based on a reservation scheme for user data traffic and a random access technique for the control and signaling traffic. The proposed scheme is based on a variable length time division frame structure formed of time slots of different types. Interleaving of type A, B and C time slots provides enhanced flexibility to handle a mix of bursty traffic unpredictable and highly correlated, while allowing to reserve bandwidth on demand to accommodate a superior grade of service and performance. Since radio channels have a higher error rate than a typical wired channel, it is necessary to transmit small packets over the wireless link. Therefore a user data message must be fragmented into small packets for the wireless link. This implies that a single user message or request may result in a group of wireless packets that need to be transmitted with a minimum delay. Stream-like traffic such as voice and video require guaranteed bandwidth for synchronous transmission. The invention includes the following features:

1. A random access control channel which is used for reservation requests and a demand-driven reservation-based data channel, one for inbound and one for outbound.

2. A unified scheme for support of bursty interactive data and stream like synchronous traffic.

3. Small contention slots to accommodate more users and achieve higher throughput.

4. A technique for flexibly and dynamically adjusting frame length and traffic mix between control and data channels as well as between inbound and outbound channels to achieve maximum throughput and limit latency.

5. An adaptive state-dependent random-access transmission scheme for the control channel to achieve maximum throughput using a real-time estimation technique.

6. A simple Bernoulli random variable generator that is computationally efficient.

Figure 2:
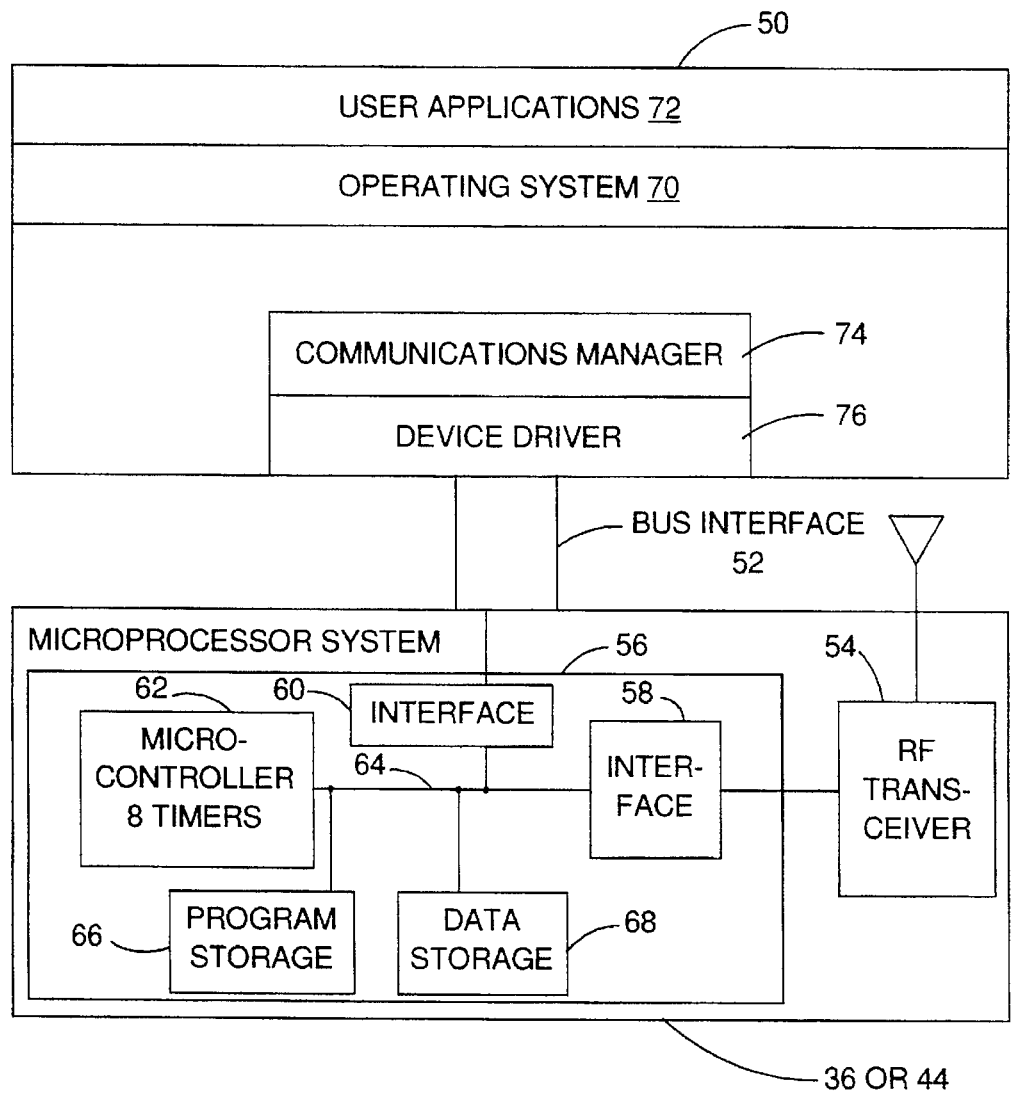
FIG. 2 is a block diagram of the radio system used in the implementation of a preferred embodiment of the invention.

Referring now to the drawings, and more particularly to FIG. 1, there is shown an indoor radio system allowing communication between a plurality of remote stations 10, 12, 14, and 16 and applications and data residing in a computing system. The computing system typically includes a Wireless Network Manager (WNM) or Wireless Network Controller 18, with attached monitor 20 and keyboard 22, of a local area network (LAN), generally indicated by reference numeral 24, having a plurality of attached workstations or personal computers (not shown for simplicity). Also attached to the LAN are one or more gateways 26 and 28 with which the remote stations 10, 12, 14, and 16 communicate. These gateways, referred to as base stations, are augmented according to the invention to provide certain radio system management functions which coordinate the remote stations' access to the common radio channel. Communications between remote stations is supported via relay through the base stations 26 and 28. As shown in more detail in FIG. 1A, a base station 26 or 28, which may be a conventional microcomputer, has a LAN adapter 30 inserted in a bus slot and connected to LAN cabling 32. The WNM 18, typically also a conventional microcomputer and including one or more direct access storage devices (DASDs) such as hard disks (not shown), also has a LAN adapter 34 inserted in a bus slot and connected to LAN cabling 32. The LAN adapters 30 and 34 and the LAN cabling 32 together with LAN software constitute the LAN 24. The LAN 24 is of conventional design. The base station 26 or 28 also has an RF transceiver adapter 36 implemented as a printed circuit card which is inserted in a bus slot of the base station. Transceiver adapter 36 includes a spread spectrum transceiver of conventional design. Transceiver adapter 36 has an antenna 38 by which a radio link 40 is established with one or more remote stations, 10, 12, 14, or 16. The remote station may itself be a hand held or lap top computer of conventional design and, like the base station, it is provided with an antenna 42 and a transceiver adapter 44, also implemented as a printed circuit card which is inserted in a bus slot of the computer. The transceiver adapter 44, like transceiver adapter 36, includes a spread spectrum transceiver of similar design. The base station and the remote stations are further provided with software, generally indicated by reference numerals 46 and 48, respectively, which support their respective transceiver adapters. FIG. 2 shows the radio system common to both the remote stations and the base stations of FIG. 1. The radio system includes a transceiver adapter 36 or 44 connected to the computer 50 via the computer's bus interface 52. The transceiver section is itself divided into an RF transceiver 54, which may be a commercially available spread spectrum transceiver, and a dedicated microprocessor system 56 which controls the transceiver via an interface 58. The microprocessor system 56 further includes a system interface 60 which interfaces the transceiver section to the computer section 50. The microprocessor system includes a dedicated microprocessor 62 containing high-resolution time interval determination hardware or "timers" typical of real-time microprocessor systems. Microprocessor 62 is connected by a memory bus 64 to program storage 66 and data storage 68 as well as to interfaces 58 and 60 providing attachment to bus interface 52 and RF transceiver 54, respectively. Program storage 66 is typically read only memory (ROM), while data storage 68 is static or dynamic random access memory (SRAM or DRAM). Packets received or to be sent are held in data storage 68 and communicated to or from the RF transceiver 54 via interface 58 under control of serial channels and a direct memory access (DMA) controller (not shown) which is part of the microprocessor 62. The function of these serial channels is to encapsulate data and control information in an HDLC (high-level data link control) packet structure and provide the packet in serial form to the RF transceiver 54. For more information on the HDLC packet structure, see, for example, Mischa Schwartz, Telecommunication Networks: Protocols, Modeling and Analysis, Addison-Wesley (1988).

When a packet is received through the RF transceiver 54, the serial channels check the packet destination address, check for errors, and deserialize the packet to data storage 68. The serial channels must have the capability to recognize a specific adapter address as well as a broadcast address. Specific microprocessors with appropriate serial channel and timer facilities include the Motorola 68302 and the National HPC46400E microprocessors. The computer 50 runs an operating system 70 which supports one or more user application programs 72. The operating system 70 may include a communications manager 74, or the communications manager 74 may itself be an application program installed on the computer. In either case, the communications manager 74 controls a device driver 76 via the operating system 70. The device driver 76, in turn, communicates with the transceiver adapter 36 or 44 via bus interface 52.

PROTOCOL SYSTEM DESCRIPTION

Figure 3:
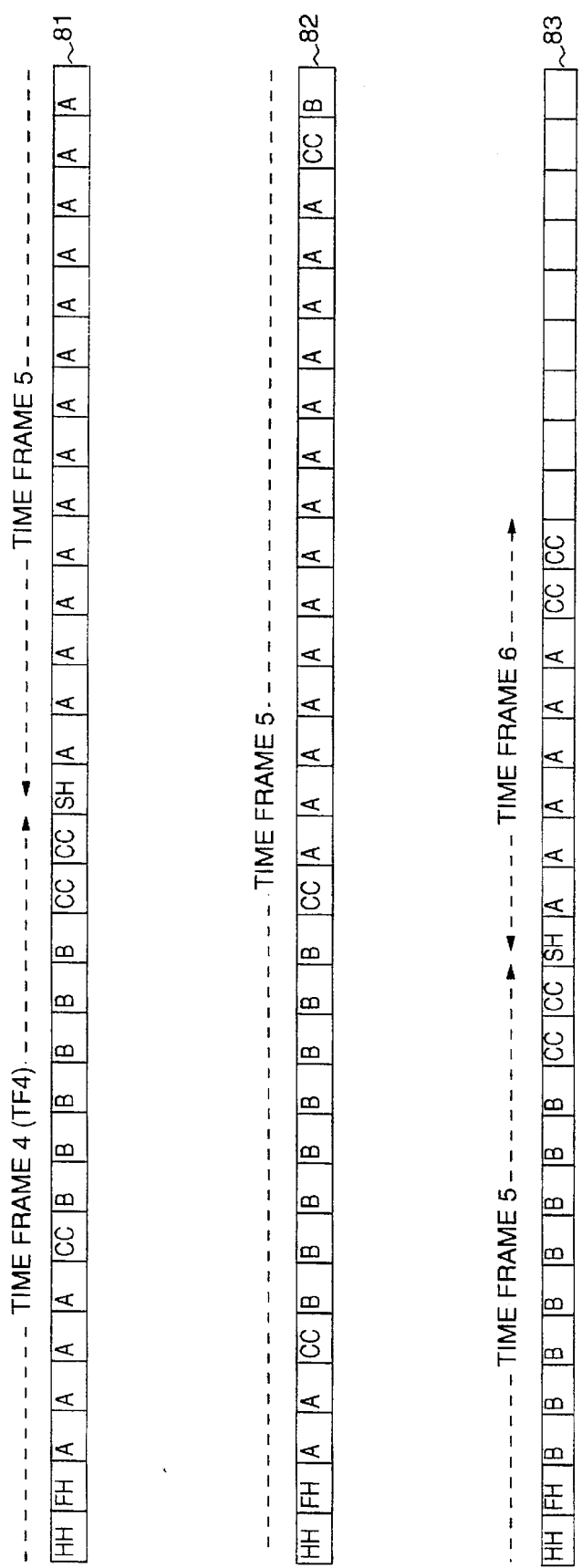
FIG. 3 is a diagram of the frame structure of the MAC protocol according to the invention.

The variable length time frame structure consists of interleaved A, B and C type time slots along with frame and frequency hopping headers as shown in FIG. 3. The structure and length of the frame is traffic dependent, all frames start with a header packet SH which describes the structure of the frame, followed by interleaved sequences of contiguous type A, type B or type C time slots, each sequence of contiguous time slots of the same type being designated as a period. During A time slots the radio link is used exclusively for outbound data transfer from the base station to remote stations and acknowledgements in the reverse direction. Both control and data outbound traffic occurs within A slots. During B slots the radio link is used exclusively for reservation-based inbound data transfer from the remote stations to the base station and acknowledgements in the reverse direction. Only inbound data traffic occurs within B slots. In a preferred embodiment of the invention, during C slots the radio link is used for contention based inbound data transfer from remote stations to the base station and acknowledgements in the reverse direction. However the person skilled in the art can easily devise other arrangements in which type C slots are used for direct communication between remote stations without using the base station as a relay. Both control and data traffic may occur within C slots. A and B time slots have the same duration which is equal to twice the duration of a C slot. In a preferred embodiment of the invention type C time slots are always grouped by pairs and will be referred to as C pairs. Slot allocation is performed by a scheduler resident in the base station adapter 26 or 28 in FIG. 1A. Time slots are allocated in each time frame for inbound and outbound transfers according to instantaneous traffic conditions, the time frame duration is variable as can be seen from the six examples of time frames shown in FIG. 3 (time frame 0 to time frame 6). Each line in FIG. 3 (80, 81, 82, 83) represents a frequency hop time period. Hop header (HH) is sent before switching from the current frequency to the next one in the hopping pattern. It is used by registering remote stations to select a base station. Frequency header (FH) is sent after the frequency has been switched. It is used for synchronization between the base station and remote stations and for hopping pattern tracking, it also provides traffic information for power saving purposes. Slot header (SH) is sent at the beginning of each time frame, it carries traffic information representative of the structure of the time frame describing the sequence of interleaved type A, type B and type C periods to come. Each period being defined by its type A, B or C, the number of slots and the destination and source address of the slots. In a particular embodiment of the invention source and destination addresses can be used for type C slots allocated for direct transmission between two remote stations without using the base station as a relay. Referring now to the first frequency hop 80 in FIG. 3, it shows the last portion of time frame 0 which consists of 4 type A slots for outbound traffic followed by 1 type C pair for contention-based inbound data and control traffic, 3 type B slots for reservation based inbound data traffic and 2 type C pairs. It is assumed that the SH header corresponding to time frame 0 was sent during the previous frequency hop not represented in this figure. Time frame 1 (tf1) follows, it starts with a SH header, followed by two type C pairs. The structure of time frame 2 is identical to time frame 1. Time frames 1 and 2 are illustrative of the traffic sent by an idle base station. Time frame 3 comprises 3 type B slots dedicated to reservation based inbound traffic followed by two type C pairs. This is the kind of traffic experienced when there is no outbound message from the base station to the remote stations. Time frame 4 spills over a frequency hop boundary represented by the HH/FH headers sequence at the beginning of the second frequency hop 81 in FIG. 3. Time frame 4 consists of a SH header followed by 9 type A slots, 1 type C pair, 6 type B slots and 2 type C pairs. The HH/FH headers sequence is inserted after the 5 first type A slots of time frame 4 to reserve time for frequency hopping. Time frame 5 spills over two frequency hop boundaries represented by the HH/FH headers sequences at the beginning of the third and fourth frequency hops 82 and 83, it comprises 16 type A slots, followed by one type C pair, 8 type B slots, 1 type C pair, 14 type A slots, 1 type C pair, 9 type B slots and 2 type C pairs. Both time frame 4 and 5 are representative of fairly highly loaded traffic. They show how a time frame may extend over two or more frequency hops. In addition time frame 5 shows how different types of slots can be interleaved in the same time frame. It should be noted that the HH and FH headers are transmitted on a cyclic basis corresponding to the fixed frequency hopping period THOP, whereas the SH headers are sent at a pace depending on traffic conditions. To this extent and from an OSI model perspective, the physical layer is decoupled from the MAC layer. Type C slots constitute the control channel used for the transmission of reservation requests and data from the remote stations to the base station in a random access mode using a slotted Aloha protocol. A finite number of remote stations contend on the control channel to make requests for a number of slots (corresponding to one user message) on the outbound or inbound data channel. The slot sizes in the A and B periods are equal and each accommodates one wireless data packet. The slots in the C period are typically smaller, in the preferred embodiment of the invention C slots are half the size of A or B slots and are grouped by pairs of slots. Each such type C slot accommodates one control packet. The use of pair of type C slots for the control channel yields higher efficiency both in terms of the number of users that can be supported and bandwidth utilization, than if full sized slots were used. This is because the contention channel achieves a throughput of about 37% in slotted Aloha (i.e., a wastage of 63%) whereas the A and B periods always have 100% utilization. Thus, the only bandwidth wastage occurs in the control channel so wastage is minimized in the invention by making the C slots smaller. In the C period, any remote station may contend for the channel and transmit a message without an explicit allocation from the base station. The contention scheme is based on a slotted Aloha protocol such that each of the finite number of remote stations attempts to transmit in a given type C slot with some probability p. The stochastic decision to transmit or not is made independently at each of the remote stations. If at most one mobile station attempts to transmit in a slot, then that station has successfully contended for transmission. If more than one station attempts transmission in a slot, then they collide and will try to retransmit in the next C slot with the same probability p. The value of this probability is adaptive and it may be changed from one frame to another by the base station. An estimation algorithm for adapting this p value is described later. The base station informs (using the SH header) all of the remote stations about the new value of p at the beginning of the time frame. Since collisions cannot be detected, an acknowledgement message is used to signify the correct reception of a packet. Therefore, all packet transmissions must be acknowledged either individually or as a group. Period C is used for the following types of information:

1. Registration requests that enable remote stations to identify themselves and request the services of the base station.

2. Requests for transmission time on the inbound channel (type B slots).

Transmission time requests can be either for synchronous or asynchronous services. Here, by synchronous service is implied establishment of a connection that requires guaranteed bandwidth for a sustained period of time. When a remote station transmits a reservation request, it identifies the type of service it requires plus the number of slots for asynchronous service or the bandwidth for the synchronous service. The base station schedules the allocation of slots and transmits the map of the schedule to each remote station in SH packet header. For asynchronous traffic, slots are allocated in each frame for the duration of the connection. These slots can be positioned anywhere within a frame. For synchronous traffic, slots are reserved in the first available frame, and in the following frames, for the requested allocation. The reservation requests can also be piggy-backed on the first data packet in order to reduce contention on the control channel. The base station ensures scheduling of all received requests. In the preferred embodiment of the invention the duration of the various headers and slots is as follows:

HH and FH headers: 2 milliseconds (ms)

SH header: 8 ms

A and B slots: 4 ms

C slots: 2 ms

PROTOCOL HEADER PACKETS

All data exchanged between a base station and a remote station is carried in the form of HDLC packets. The establishment of a HDLC link between a remote station and its owning base station is done at connection establishment time and simply corresponds to the allocation by the base station of an HDLC address to the connecting remote station. Protocol header packets (HH, FH and SH) follow the commonly used HDLC framing. It starts with a flag sequence F followed by the destination and source addresses (DA, SA), a control field C indicating the nature of the packet and carrying various control information, data field length L, information data, a frame check sequence FCS and flag sequence F. The information data field comprises fields carrying a code representative of the nature of the packet, the length of the data fields and a data field. Protocol header packets are carried in the information data field of HDLC packets.

Table 1 represents the structure of the HH packet used in the preferred embodiment of the invention. The hh_data field carries the identifier of the wireless network (NETID), the base station HDLC address BSID and the frequencies of the next two hops NEXT_FREQ(1–2).

TABLE 1

| Protocol header packet HH | |
|---|---|
| FIELD | MEANING |
| CODE | Control packet code field |
| LENGTH | Length of the remaining fields |
| KEY | Key of the hh_data field |
| LGTH | Length of hh_data |
| NETID | Network Id of the wireless network |
| BSID | Base station HDLC address |
| NEXT_FREQ(1-2) | Frequency of the next two hops |

Table 2 represents the structure of the FH packet used in the preferred embodiment of the invention. The fh_data field comprises NETID, BSID, the current frequency CURR_FREQ and the frequencies of the next eight hops NEXT_FREQ(1-8).

TABLE 2

| Protocol header packet FH | |
|---|---|
| FIELD | MEANING |
| CODE | Control packet code field |
| LENGTH | Length of the remaining fields |
| KEY | Key of the fh_data field |
| LGTH | Length of the fh_data |
| NETID | Network Id of the wireless network |
| BSID | Base station HDLC address |
| CURR_FREQ | Current Frequency |
| NEXT_FREQ(1-8) | Frequency of the eight next hops |

Table 3 represents the structure of the SH packet used in the preferred embodiment of the invention. This packet carries a sequence of two data fields sh_data and sh_map. The sh_data field comprises NETID, BSID, the frequency of the next hop NEXT_FREQ and an estimate K of the number of remote stations attempting to transmit using type C slots. The sh_map field carries a list of up to 16 quadruplets (SLOT_MAP) representing the sequence of type A, B and C slots in the next time frame, groups of consecutive slots of the same type being grouped into periods. Each quadruplet is four bytes long and carries information about a given period of the next time frame. The first byte carries a code representing the type of slot A, B or C which has been selected, the second byte carries the HDLC address of the station allowed to transmit during the given segment of the next time frame, the third byte carries the HDLC address of the receiving station and the fourth byte carries the number of slots of the selected type allocated to the transmitting station. For C slots the source address is station broadcast address as any remote station can contend for the C slots.

TABLE 3

| Protocol header packet SH | |
|---|---|
| FIELD | MEANING/VALUE |
| CODE | Control packet code field |
| LENGTH | Length of the remaining fields |
| KEY | Key of the sh_data field |
| LGTH | Length of sh_data |
| NETID | Network ID of the wireless network |
| BSID | Base station HDLC address |
| NEXT_FREQ | Frequency od the next hop |
| K | Current estimate of users actively attempting transmission in the C slots. |

TABLE 3-continued

| Protocol header packet SH | |
|---|---|
| FIELD | MEANING/VALUE |
| KEY | Key of the sh_map |
| LGTH | Length of sh_map |
| MAP_LGTH | Number of meaningfull quadruplets in the slot map. |
| SLOT_MAP | List of 16 quadruplets of the form <type, source, destination, number> (C slots are counted by pairs). The type field specifies if the slots are of type A or of type B or of type C. For C pairs, the source address is set equal to the broadcast address as any remote station can get a C slot. |

Operation at the Base Station

Figure 4:
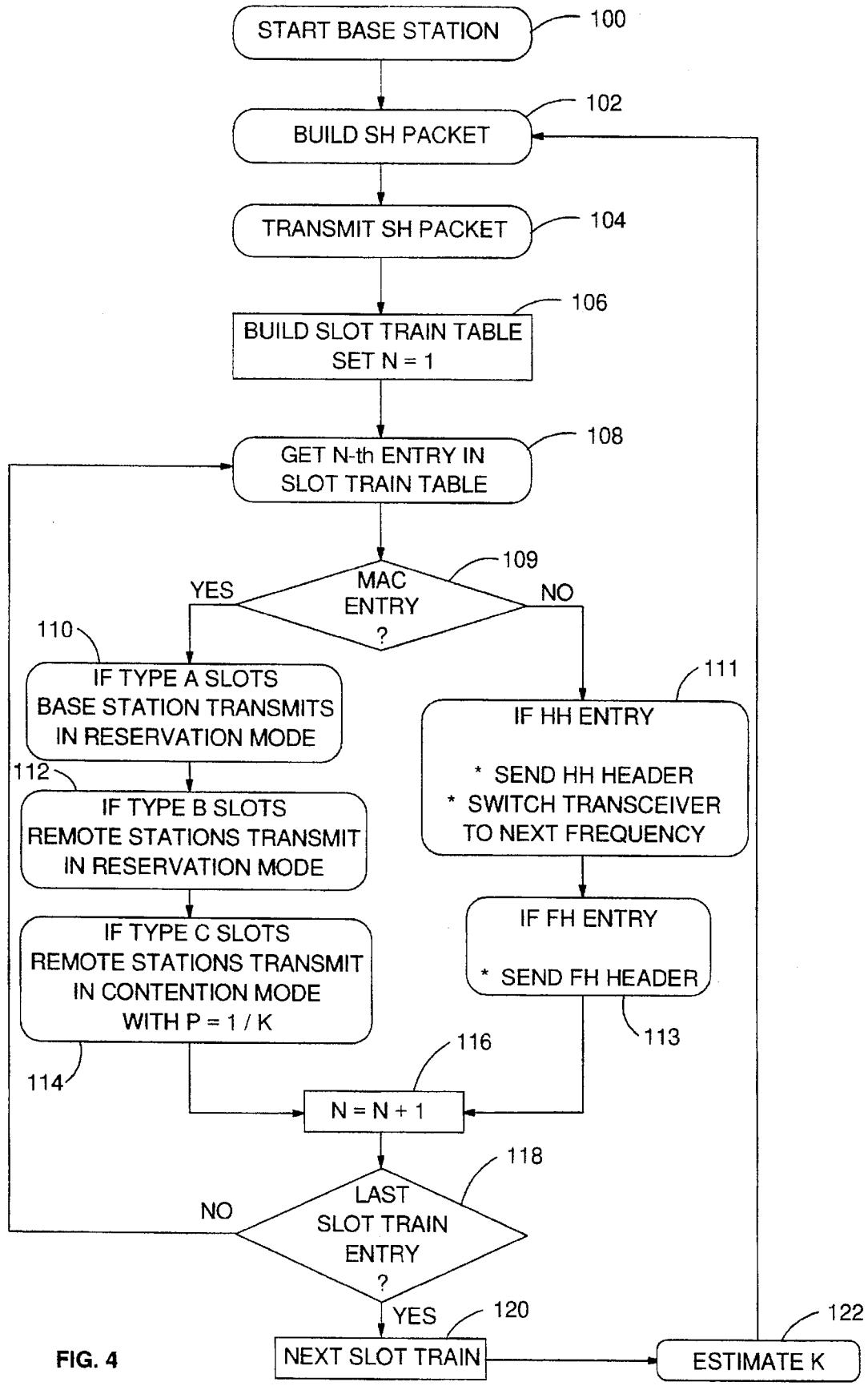
FIG. 4 is a flow chart of the logic followed by a base station in the MAC protocol of the invention.

An overview of the logic followed by a base station is shown in FIG. 4. When the base station is powered on, it executes an initialization procedure at block 100. At the beginning of a frame, as shown at block 102, the base station builds a packet header SH based on pending outbound packets transmission requests and inbound bandwidth reservation requests and transmits it at block 104 to remote stations. The method used by the base station to build the SH header and more particularly the SLOT_MAP field of SH header is described in relation with FIG. 8. At block 106 the base station builds a table designated as current slot train table and sets the value of counter n to 1. The slot train table is used by the base station to schedule the proper sequence of A, B and C time slots, according to the mapping described in the SLOT_MAP field of packet header SH. In addition it is used to insert HH and FH packets according to the frequency hopping time period. Each entry in the slot train table represents either a A, B or C slot, or a HH/FH slot for hopping frequency. Table 4 below shows the structure of the slot train table built by the base station for scheduling time slots based on the mapping described in SLOT_MAP field.

TABLE 4

| Slot train table | |
|---|---|
| INDEX N | SLOTS MAPPING |
| 1 | 1st quadruplet of SLOT_MAP |
| 2 | 2nd quadruplet of SLOT_MAP |
| . | . |
| . | . |
| . | . |
| n | n-th quadruplet in SLOT_MAP |
| n + 1 | HH slot |
| n + 2 | FH slot |
| n + 3 | n + 1-th quadruplet in SLOT_MAP |
| . | . |
| . | . |
| . | . |
| m | m-th quadruplet in SLOT_MAP |

Table 4 carries one entry for each quadruplet in SLOT_MAP field of SH header, each entry carries an index followed by the corresponding quadruplet in the same sequence as in the SLOT_MAP field. In addition time slots are reserved for HH and FH headers transmission for signaling frequency hops, e.g. entries n+1 and n+2 in table 4. HH and FH entries positions in slots trains tables are strictly time dependent and do not depend on traffic conditions but are based only on the frequency hopping time period. Such HH and FH entries are mandatorily reserved in the slot train tables every THOP seconds, THOP being the periodicity of frequency hops. In other words HH and FH entries in the slot train table relate to the physical layer (RF transmission) of the communication protocol stack whereas, A, B and CC entries relate to the medium access control (MAC) layer.

At block 108 the base station gets the N-th entry in slot train table which carries the corresponding quadruplet in the SLOT_MAP field of the SH header, starting with the first quadruplet (N=1) at the beginning of each slot train. A test is made in block 109 to determine whether the N-th entry in slot train table is a HH or FH type entry or a MAC type entry. If it is a MAC type entry the base station proceeds to block 110. If the first byte of the quadruplet carried by the N-th entry in the slot train table indicates that type A slots have been selected, the base station transmits in reservation mode to the remote station whose address is indicated by the third byte of the quadruplet, for a number of slots indicated in the fourth byte of the same quadruplet, as represented by block 110. If the first byte of the quadruplet indicates that type B slots have been selected, the base station listens to remote stations for the number of slots indicated in the fourth byte of the N-th quadruplet as represented by block 112. If the first byte of the N-th quadruplet indicates that type C slots have been selected, the base station listens to remote stations transmitting in contention mode with the probability p=1/K, for the number of slots indicated in the fourth byte of the N-th quadruplet as represented by block 114. It is important to notice that the MAC scheme used in the invention allows direct transmission from a remote station to another remote station without using the base station as a relay, in such a case the destination and source addresses of the corresponding quadruplet are set to the respective addresses of the transmitting and receiving remote stations. In block 116 the base station increments counter N by 1 and loops back to block 108 if there are entries left in the current slot train table to be processed as shown by block 118. If there is no entry left, the base station proceeds to the next slot train as shown in block 120. It estimates a new value for K at block 122 and loops back to block 102 to build the next SH packet. The method used to estimate K is described in detail in a later section in relation with FIG. 9, 10, 11 and 12. If the test made at block 109 indicates that the N-th entry in the slot train table is a HH or FH the base station proceeds to block 111, if the N-th entry is a HH entry the base station sends the HH header and switches its RF transceiver to the next frequency, as depicted in block 111. If the N-th entry is a FH entry, the base station sends the FH header as represented by block 113. After processing either the HH or the FH entry the base station proceeds to the next entry by incrementing counter N by 1 in block 116.

Operation at the Remote Station

Figure 5:
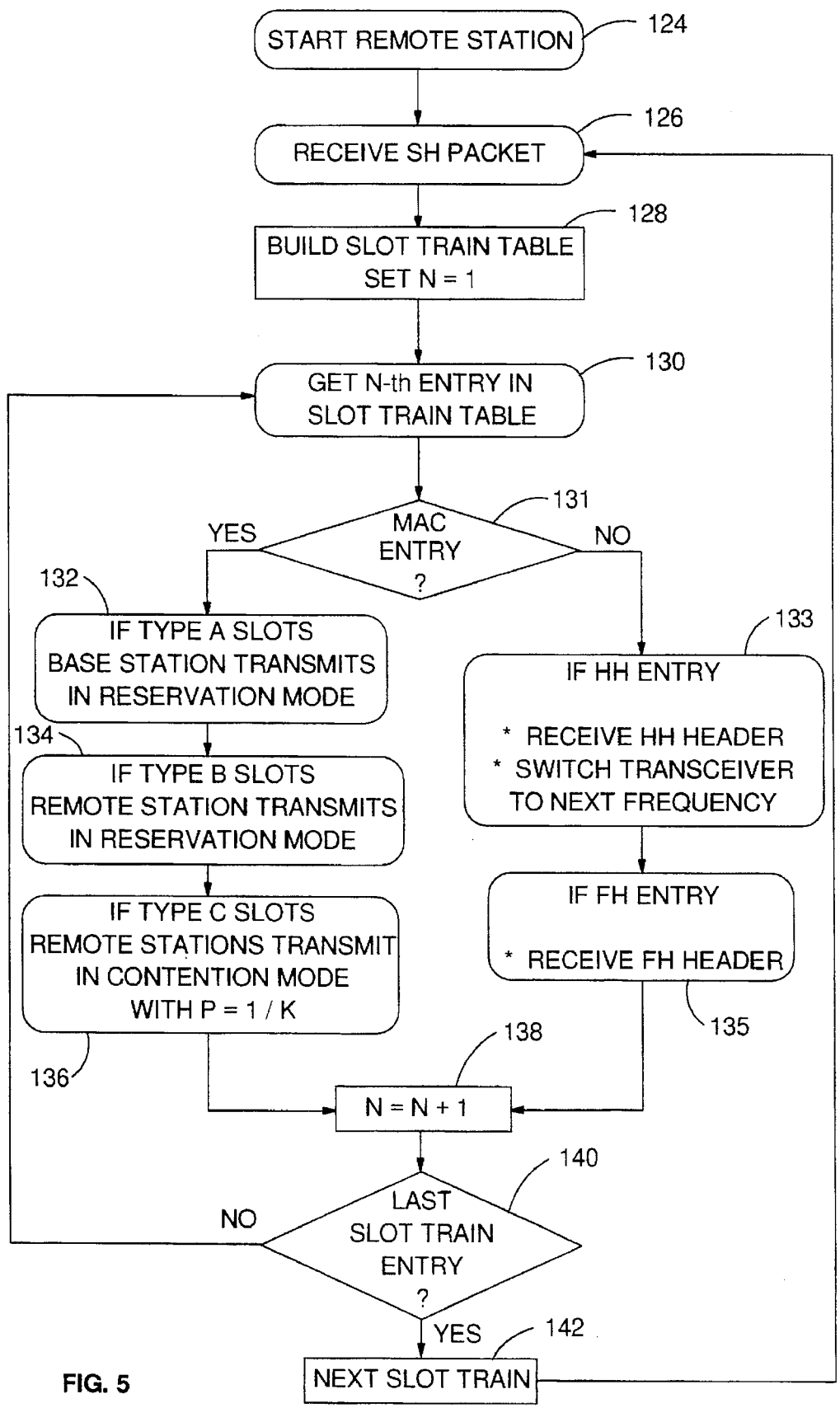
FIG. 5 is a flow chart of the logic followed by a remote station in the MAC protocol of the invention.

An overview of the logic followed by a remote station is shown in FIG. 5. When the remote station is powered on, it executes an initialization procedure at block 124 and sets internal parameters. Then, it obtains synchronization with the base station and starts listening to the next SH packet header as represented by block 126. When a SH packet header is received the remote station builds the slot train table reflecting the slot mapping of the SLOT_MAP field carried by the received SH header and sets counter N to 1, as represented by block 128. At block 130 the remote station gets the N-th entry in the slot train table, starting with the first entry (N=1) at the beginning of each slot train. In block 131 the base station determines whether the N-th entry is a MAC type entry or a HH/FH type entry. If it is MAC type entry the base station proceeds to block 132. If the first byte of the quadruplet carried by the N-th entry indicates that type A slots have been selected, the remote station addressed by the third byte of the quadruplet listens to the base station for a number of type A slots indicated in the fourth byte of the quadruplet as represented by block 132. One advantage of this method is that the other remote stations with a different HDLC address, switch to a power saving state for the duration of the type A slots. If the first byte of the quadruplet indicates that type B slots have been selected, the remote station whose address HDLC matches the third byte of the quadruplet transmits in reservation mode for a number of type B slots indicated in the fourth byte of the quadruplet as represented by block 134. The other remote stations with a different HDLC address switch to a power saving state for the duration of the type B slots. If the first byte of the quadruplet indicates that type C slots have been selected, all remote stations are allowed to transmit in contention mode for the number of type C slots indicated by the fourth byte of the quadruplet as depicted in block 136. Stations having no outstanding transmission request switch to a power saving state for the duration of type C slots. At block 138 the remote station increments counter N by 1. If there are remaining quadruplets in the SLOT_MAP field of the current SH header the remote station loops back to block 130 to process the next slot train table entry as represented by step 140. If there is no remaining entry in the current slot train table, the remote station proceeds to the next slot train at step 142 and loops back to block 126 to receive the next SH packet header. If the test performed in block 131 indicates that the N-th entry in the slot train table is a HH or FH type entry, the base station proceeds to block 133. If the current entry is a HH type entry the base station receives the HH header sent by its home base station at block 111 in FIG. 4 and switches its RF transceiver to the next frequency, as depicted in block 133. If the current slot train table entry is a FH type entry the remote station receives the FH header sent by its home base station at block 113 in FIG. 4, as depicted in block 135. Next the base station proceeds to block 138 to increment counter N by 1 and process the next entry in the slot train table in block 140.

Slots Interleaving

An adaptive method is used to adjust the MAC content of the slot trains defined by the mix and the duration of type A, type B and type C periods, in order to quickly accommodate changes in traffic conditions. The structure of the slot train is computed at the beginning of each slot train as represented by block 102 in FIG. 4. Time slots allocation is balanced between inbound and outbound traffic by using a queue swapping algorithm. A minimum bandwidth is preserved for type C slots to provide good performance for the control channel and to ensure that when a new remote station enters the base station's cell, it will find a non-zero C period in which to perform registration.

Figure 6:
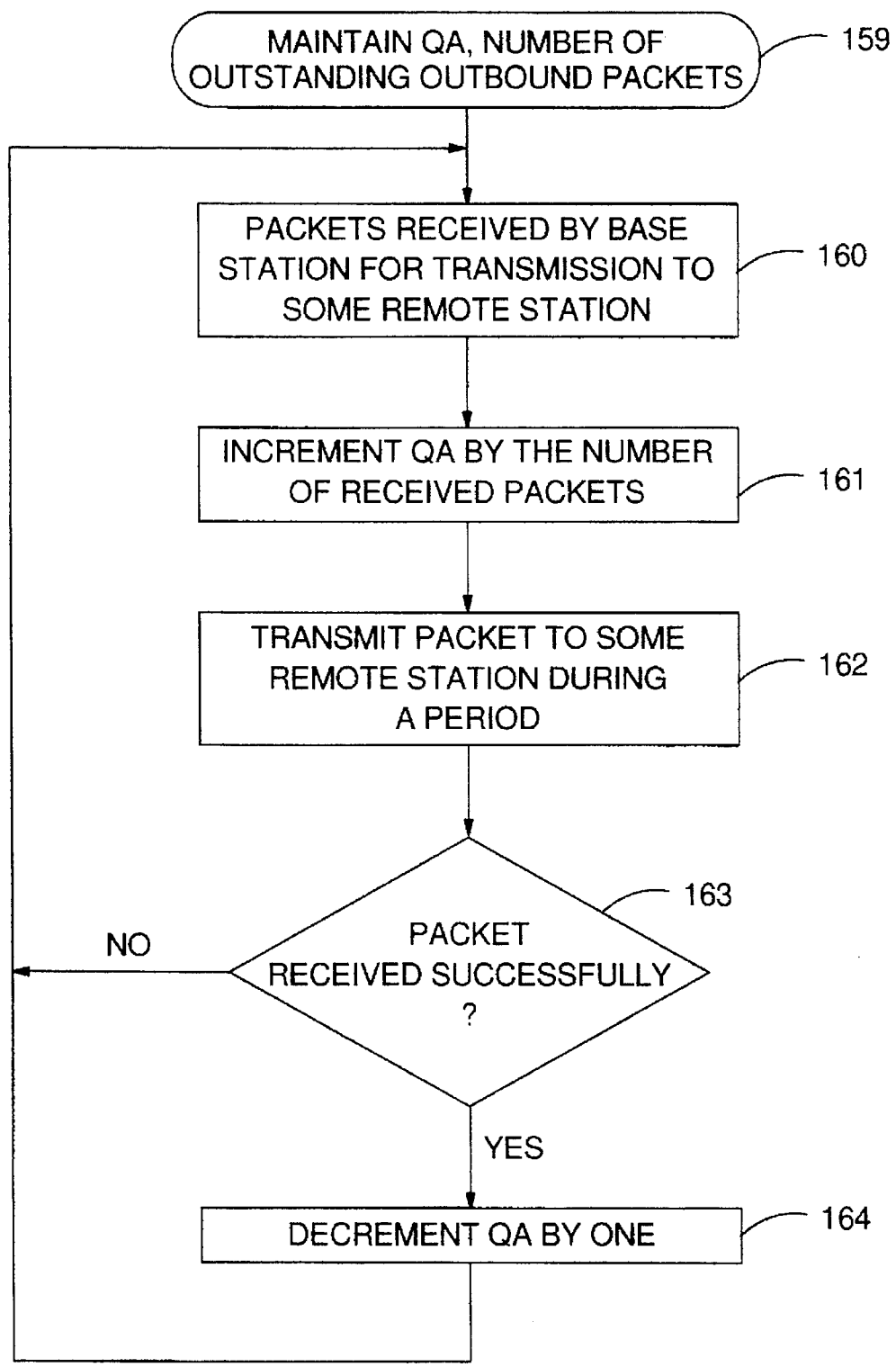
FIG. 6 is a flow chart for computing the number of outstanding packets for period A of the MAC protocol.
Figure 7:
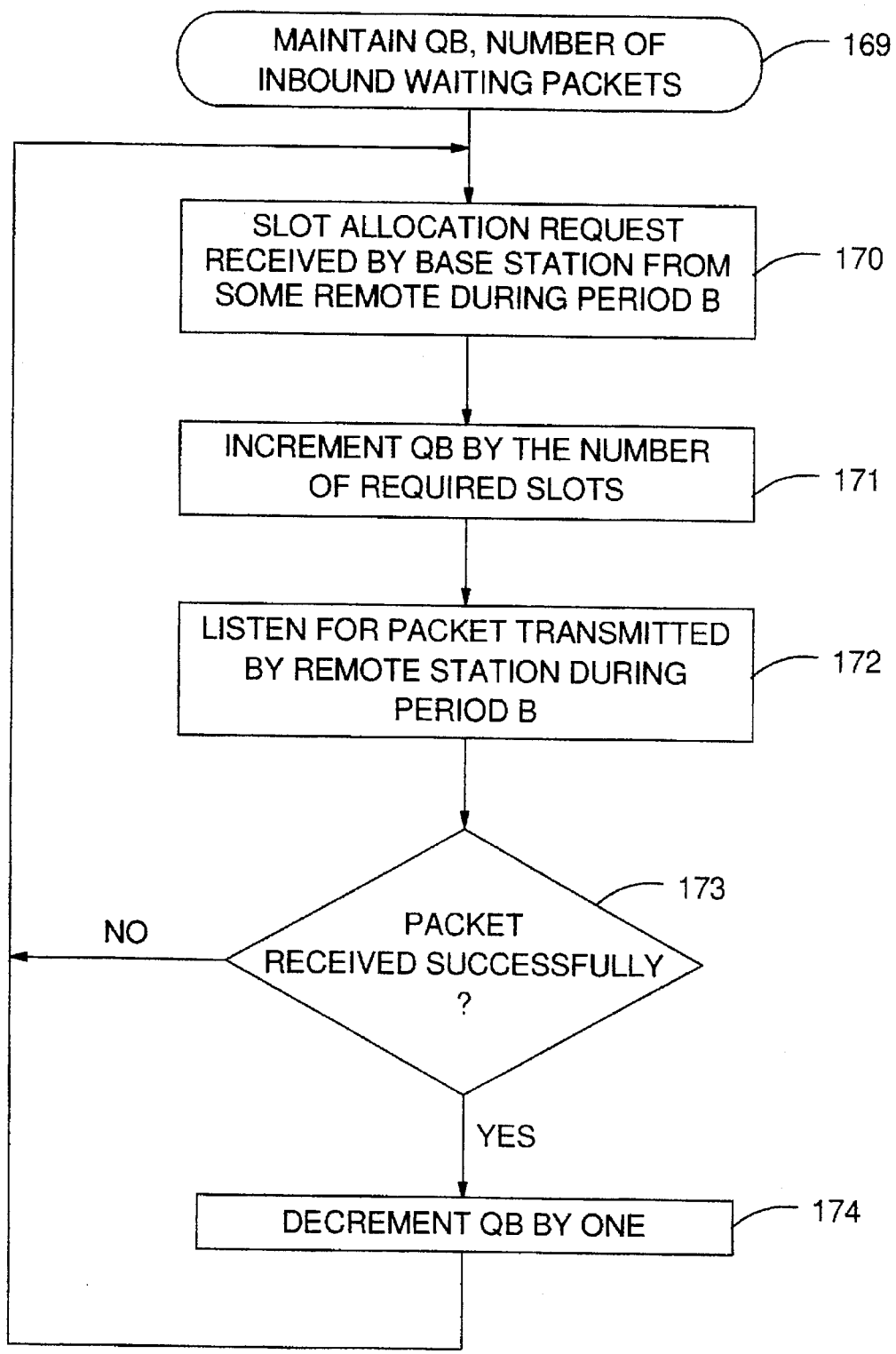
FIG. 7 is a flow chart for computing the number of outstanding packets for period B of the MAC protocol.

The method described is a centralized scheme that is run at the base station. The base station schedules type A and type B slots based on the queues lengths QA, and QB (traffic waiting to be transmitted) for type A and type B traffic as shown in FIG. 6 and FIG. 7. Computation of QA and QB is performed by the base station. As shown in FIG. 6, the base station maintains variable QA at block 159 which represents the total number of "outbound waiting packets" to be sent in type A slots. For each new outbound data frame received for transmission at block 160 by the base station, QA is incremented at block 161 by the number of packets required to transmit the associated buffer. For each packet transmitted in the A period at block 162, QA is decremented by one at block 164 if the packet is successfully received by the remote station at block 163 (i.e., an acknowledgment is received). If the packet is not received successfully at block 163, a return is made to block 160, as is the case following QA being decremented by one at block 164.

As shown in FIG. 7, the base station maintains variable QB at block 169 which represents the total number of "inbound waiting packets" to be received by the base station from the remote stations during type B slots. For each slot allocation request received from a remote station at block 170, QB is incremented by the number of required slots at block 171. For each packet that is transmitted in the B period at block 172, QB is decremented by one at block 174, if the packet is successfully received by the base station as determined at block 173 (i.e., an acknowledgment is received). Otherwise (e.g., if a packet is lost, that is, it is not received successfully, due to radio interference) QB is not changed. Following either event, a return is made to block 170.

In a preferred embodiment of the invention each outbound packet is allocated one type A slot and each inbound packet is allocated one type B slot. The slot allocation algorithm is run at the beginning of each slot train as represented by block 102 in FIG. 4 and the structure of the current slot train is broadcasted in the SLOT_MAP field of the SH header. The scheduling algorithm allocates type A and type B slots alternatively and inserts NC1 pairs of C slots between type A and type B slots, in a preferred embodiment of the invention NC1=1. NC2 Pairs of C slots are also appended at the end of each slot train, in a preferred embodiment of the invention NC2=2. Consequently slot trains consist in a sequence of interleaved type A, type B or type C periods. The man skilled in the art can easily adjust values of NC1 and NC2 to accommodate specific traffic conditions, other arrangements may also be devised in which type C slots are inserted according to a different scheme, for instance C slots can be inserted after each sequence of contiguous A and B periods. Examples of slot trains have been described in relation with FIG. 3. It should be noticed that the duration of a slot train, designated as a time frame, may be shorter or longer than a frequency hopping period (THOP), and may overlap several frequency hopping periods. Slots are allocated on a data frame basis which means that data frames are divided into packets which are all allocated slots in the same time frame, except in retry situations. Slot trains size is limited to a maximum number Nd representing the total number of type A, type B or type C periods in a slot train. For instance, setting Nd to 16 limits the maximum size of a slot train to a total of 8 type A or type B periods each followed by a type C period. Limiting the size of a slot train by setting a maximum number of type A and type B periods is not sufficient to provide fair access to the communication channel when type A and type B traffic are not balanced, i.e. when either the inbound or the outbound queue is empty. For instance, if QB equals 0, which means that there is no pending inbound packet, one needs to limit the size of the next available periods in the current slot train which will be dedicated exclusively to type A slots. When QB, respectively QA counters are detected to reach 0, at most one additional type A, respectively type B period is scheduled in the current slot train even if the maximum number of periods Nd has not been reached. The number of slots allocated to this last period is limited by setting a maximum number of slots Nt. Consequently the algorithm prevents that the communication channel be dedicated to either inbound or outbound traffic for too long. Limiting the size of slot trains improves network latency specially in case of sporadic traffic conditions in one way that would affect network latency for traffic in the other way.

Figure 8:
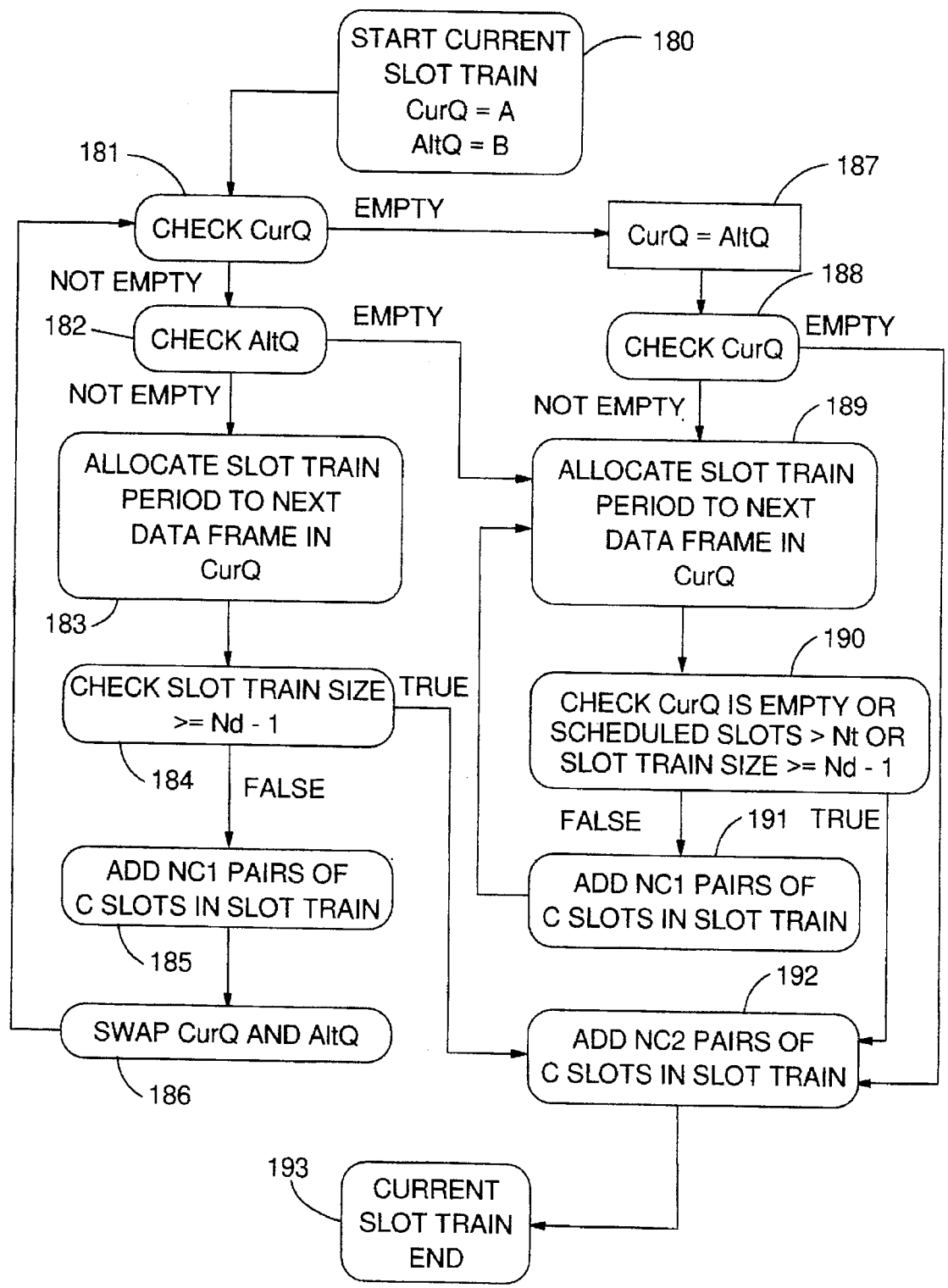
FIG. 8 is a flow chart of the type A, type B, type C slots allocation method of the MAC protocol.

Referring now to FIG. 8 it shows the scheduling algorithm run by the base station to establish the MAC structure of the slot trains as represented by the SLOT_MAP field of the SH packet header. This algorithm is used by the base station in block 102 of FIG. 4 to build the SLOT_MAP field of the SH header for the current slot train. In block 180 the base station starts by defining two queues CurQ and AltQ. Current queue CurQ is initialized to be the outbound queue designated by A, associated with counter QA. Alternate queue AltQ is initialized to be the inbound queue designated by B, associated with counter QB. The logic flow of the slot scheduling method comprises two paths. The first path consists in blocks 181 to 186 and is executed when both CurQ and AltQ are not empty, as a result of this path the process schedules alternatively type A and type B periods, each followed by NC1 type C slots, until the maximum slot train size Nd is reached. The second path consists of blocks 188 to 192 and is executed when either CurQ or AltQ is empty. It allocates slots to the remaining non empty queue until either the maximum number of slots Nt is reached or the maximum slot train size Nd is reached.

Following now the first path the base station checks in block 181 the current queue CurQ for pending transmission requests. CurQ is alternatively set to be the A queue or the B queue as explained below. Let us assume that it is the A queue. Checking the current queue in such a case, consists of checking the value of QA. If QA equals 0, this means that the current queue is empty and the process jumps to block 187, the alternate Q is set to become the current queue and the process follows the second path of the logic flow starting in block 188. In block 182 the base station checks the alternate queue AltQ, i.e. B queue, for pending inbound transmission requests. If QB equals 0, this means that the inbound Q is empty, the process switches to the second path of the logic flow in block 189. When both CurQ and AltQ are not empty the base station allocates a slot train period to the next data frame in the current queue CurQ as represented by block 183. The number of slots allocated is adjusted to fit the entire data frame. Type A slots are allocated to outbound data frames, type B slots are allocated to inbound data frames. As part of the processing performed in block 183 the data frame is removed from the current queue after it has been allocated a period in the slot train. Next the base station checks the slot train size in block 184. If the total number of type A, B and C periods is greater than or equals (Nd−1) the slot train has reached its maximum size, the process jumps to block 192 to allocate NC2 pairs of type C slots forming the trailing period of the slot train. If the slot train has not reached its maximum size, NC1 pairs of C slots are reserved in block 185, CurQ and AltQ are swapped in block 186 and the process loops back to block 181 to process the next data frame in CurQ. Swapping CurQ and AltQ allows to schedule alternatively type A and type B periods in the slot train, each period being followed by NC1 pairs of C slots.

Following now the second path of the logic flow, it starts in block 188 by checking that CurQ is not empty. If CurQ is empty, this means that both queues are empty and the process jumps to block 192 to add the trailing C period of the slot train. In block 189 a slot train period is allocated to the next data frame in CurQ. The number of slots allocated is adjusted to fit the entire data frame. Type A slots are allocated to outbound data frames, type B slots are allocated to inbound data frames. As part of the processing performed in block 189, the data frame is removed from the current queue after it has been allocated a period in the slot train. In block 190, the process checks three conditions: (1) whether the current queue is empty, or (2) the total number of slots allocated to the current queue is higher than Nt, or (3) the slot train size is greater than or equals (Nd−1). If either of these three conditions is met, the trailing C period of the slot train is added in block 192. Otherwise NC1 pairs of C slots are reserved in the slot train in block 191 and the process loops back to block 189 to allocate an additional slot train period to the next data frame in the current queue.

K Parameter Estimation

Using feedback information from the remote stations (e.g., retry bit), an adaptive algorithm running at the base station is used to adjust the estimate of the number of remote stations, K, that are attempting to transmit (i.e., are active) during type C slots. This parameter is used by the base station to determine the probability of transmission, p, according to the formula K=1/p. This choice for p can be shown to maximize throughput in a slotted Aloha system. As was described in the protocol system description, the probability p is used by the remote stations in their stochastic decision to transmit or not transmit in a given type C slot. The key attributes of this method are as follows:

The method is centralized at the base station as represented by block 122 in FIG. 4. Most previously disclosed algorithms use backoff strategies in which a distributed algorithm is run at each of the remote stations. The method uses two pieces of information to estimate K, 1. A measurement of the probability of successful transmission in a C slot. Specifically, in a slot train, the ratio of the number of C slots in which a successful transmission occurs to the total number of C slots is computed.

2. A measurement of the probability that a remote station succeeds on its first attempt in a C slot given that it has succeeded. This is the ratio of the C slots in which a remote succeeds for the first time to the total number of C slots in which successful transmissions occur in the frame. The fact that the success was the first try of a remote station is communicated by a retry bit in the header of the packet that is sent from the remote to the base station.

A smoothing filter is used because of the highly varying nature of the above two measurements.

The estimate of K is updated infrequently using the same time constant as the smoothing filter.

When the base station detects that many received packets have been retried, it increases the estimated value of K (i.e., decreases the p value used by the remote stations) to decrease the number of collisions and hence increase the throughput. Alternatively, when the base station sees that only a small fraction of the packets have been retried, it decreases the value of K (i.e., increases the p value) to decrease the number of idles (i.e., slots in which no remote station attempts to transmit) and hence increase the throughput. In the described estimation algorithm, the base station increases or decreases the estimate of K by powers of 2 and ½, respectively. Performance analyses have shown that using the set of five K values: 2, 4, 8, 16, and 32 (equivalently, five p values corresponding to the reciprocals of the listed K values), results in little loss of performance when the number of the remote stations is less than about 45. The technique can, of course, be extended to situations in which there are a larger number of remote stations than 45 by using larger powers of two (i.e., 64, 128, etc.). The motivation for using powers of two is that such p values can be easily implemented at the remote stations using a simple Bernoulli random variable generator that is described later.

Figure 9:
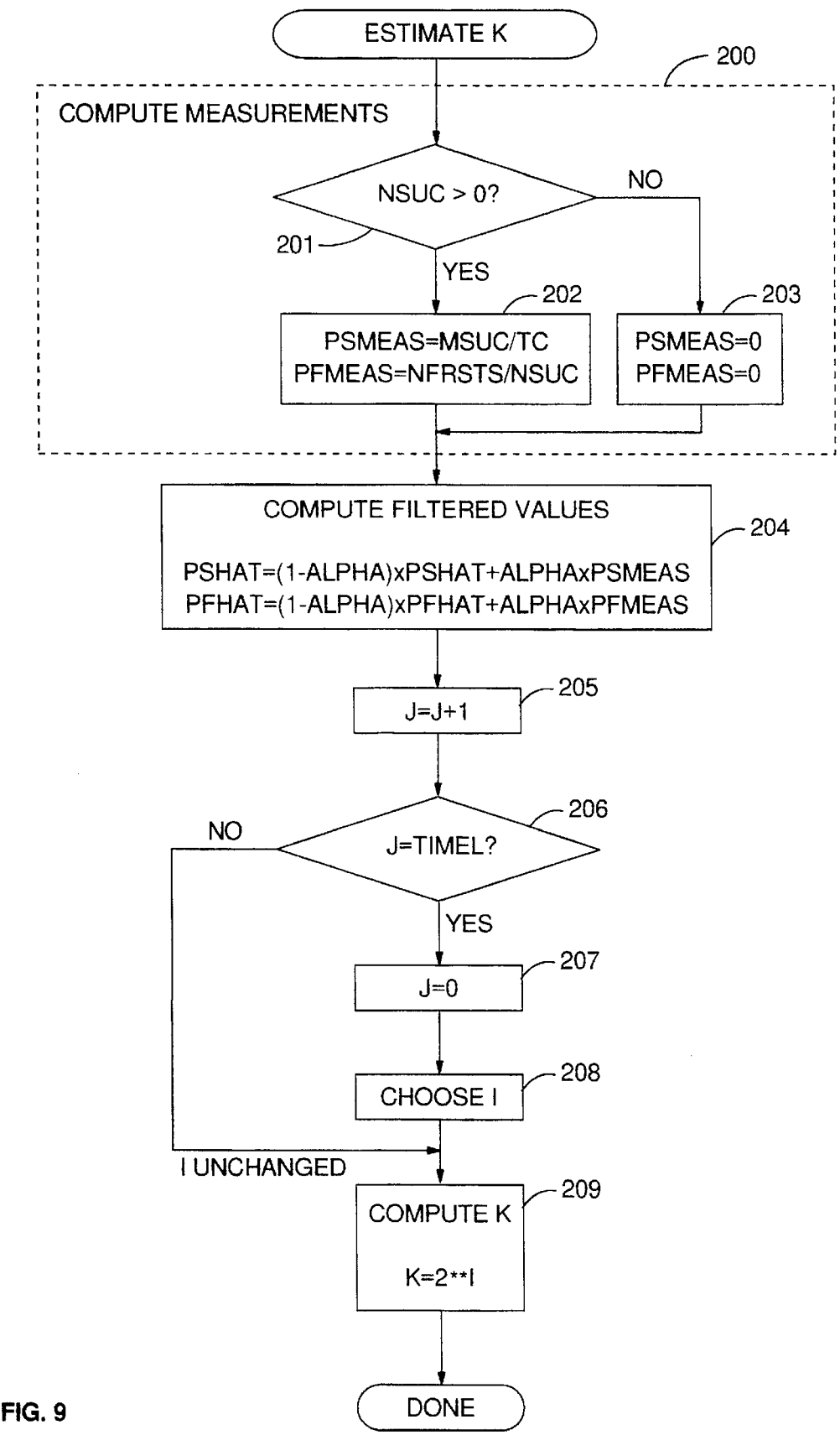
FIG. 9 is a flow chart of a method of estimating the number of remote stations that are attempting to transmit during type C slots of the MAC protocol.

The K estimation method of FIG. 9 is performed by the base station at the end of each time frame as represented by block 122 in FIG.4. It determines which value of p to use: ½, ¼, ⅛, ⅟16, or ⅟32. An index, I, is used to identify which value of p=1/K is being used. Thus, I takes on values 1, ..., 5, where p=(½)I and K=2I (where ** sign stands for the exponent sign). At the beginning of each measurement period, the base station sets two counters to zero, a NSUC counter and a NFRSTS counter. The NSUC counter is incremented by one for each C slot that results in a successful reception of a packet by the base station during the measurement period. Similarly, the NFRSTS counter is incremented by one for each C slot that results in a successful packet reception in which a retry bit is set to zero. That is, the packet header includes a control bit called the retry bit that is zero if the packet is being sent for the first time and is one if the packet has been retried one or more times. Thus, NFRSTS is the number of first packet transmissions that are successful during C slots in a measurement period. These two pieces of information along with the total duration of the C slots in the measurement period (TC), are used to compute two probability measures:

1) the probability of success, PSMEAS, and 2) the probability of first success, PFMEAS.

As shown in block 200, PSMEAS and PFMEAS are computed. At block 201, a determination is made if NSUC is greater than zero. If so, in block 202, PSMEAS is computed according to the equation, PSMEAS=NSUC/TC. It is assumed that TC>0, but PSMEAS could be set to 0 if TC=0. Further in block 202, PFMEAS is computed by the equation, PFMEAS=NFRSTS/NSUC. If NSUC is zero at the end of the frame, then PFMEAS is set to zero. This decision to set PFMEAS to zero corresponds to an assumption of many remote stations rather than none in a situation where NSUC=0. If NSUC is not greater than zero, as tested at block 201, then PSMEAS and PFMEAS are each set equal to zero in block 203.

It has been observed that the measured values, PSMEAS and PFMEAS, vary greatly from frame to frame even when the number of active remote stations is constant. This variation requires the use of the smoothing filter in block 204 to generate more reliable measurements of the probability of success and first success. The following recursive filtering equations provide a new smoothed estimate at the end of the current frame time given the last smoothed estimate at the end of the previous frame time and the current measurement:

$$PSHAT=[(1-ALPHA) \times PSHAT]+ALPHA \times PSMEAS$$

$$PFHAT=[(1-ALPHA) \times PFHAT]+ALPHA \times PFMEAS$$

Figure 10:
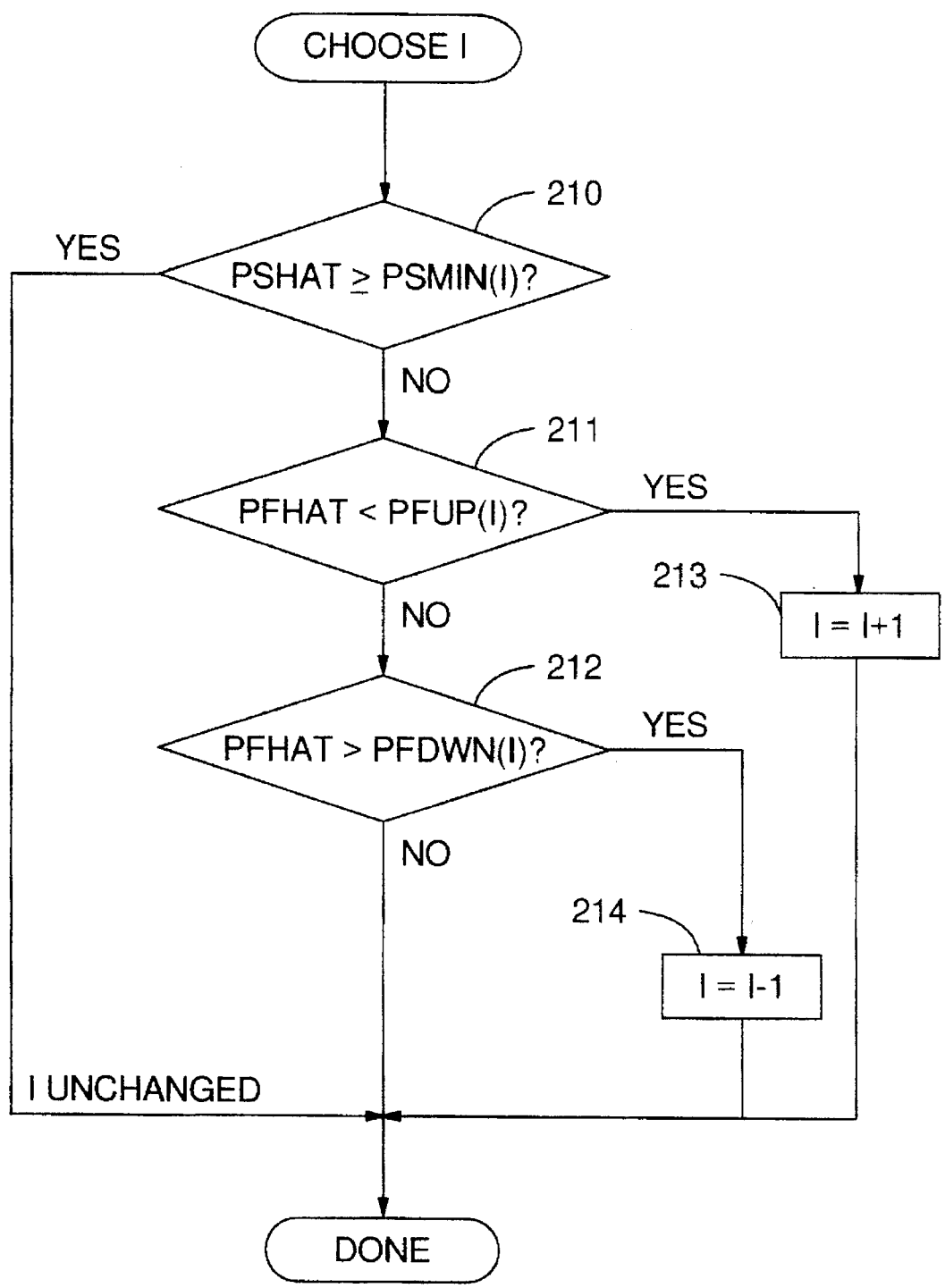
FIG. 10 is a detailed flow chart of block 208 of the flow chart of FIG. 9.

PSHAT and PFHAT are the filtered estimates of the probability of success and first success, respectively. When the base station is initialized, the values of PSHAT and PFHAT are initialized to zero. Simulation results indicate that a value of ALPHA=⅛ yields adequate smoothing properties. This value of ALPHA corresponds to a filter time constant of 7.5 frame times. Other filtering techniques are possible including sliding windows methods. An advantage of the filtering equations shown above is that they give more weight to recent measurements than older ones whereas simple sliding window techniques treat all data in the window with equal weight. Since the required filter introduces an effective lag of about 8 time frames, the estimate of K should only be updated this often. The parameter TIMEL denotes the period of the K parameter updates in units of time frames. A good choice for TIMEL is 1/ALPHA or TIMEL=8 time frames for the proposed choice of ALPHA. Thus, the value of p=1/K is kept constant for 8 time frames which is the measurement period during which new information is gathered for making the next estimate. If the value of TIMEL is chosen to be much smaller than 1/ALPHA, very oscillatory behavior can result. This infrequent update procedure is implemented in blocks 205, 206 and 207. When the base station is initialized, the frame counter J is initialized to zero in block 207. Thus, for the first TIMEL−1 frames, the initial I is not changed, but at the end of the TIMEL-th frame, the frame counter value J is reset and the I value is updated in block 208. The procedure that is used for choosing I in block 208 is shown in FIG. 10 where the values of the discrete functions PSMIN(I), PFUP (I), and PFDWN(I) are shown in Table 2. When the base station is initialized, the value of I is initially set to one corresponding to an initial K value of 2**I as shown in block 209. Given that a certain value of I has been used in the past, the K estimation method uses the current estimates, PSHAT and PFHAT, to determine whether to use I−1, I, or I+1 for the next group of TIMEL frames according to the procedure of FIG. 10. If PSHAT>=PSMIN(I) at block 210, then no action is taken meaning that the current I value continues to be used. If PSHAT<PSMIN(I), then three possible situations occur depending on the value of PFHAT:

1. If PFHAT<PFUP(I) at block 211, then the value of I is increased by 1 at block 213 corresponding to a doubling of K.

2. If PFUP(I)=<PFHAT=<PFDWN(I) at block 212, then the value of I is not changed.

3. If PFDWN(I)<PFHAT in block 212, then the value of I is decreased by 1 in block 214, corresponding to a halving of K.

Analytic results have been used to compute the function values shown in Table 5. These results are based on the analysis of a slotted Aloha system with a constant number of active remote stations.

TABLE 5

| Function values for estimation method. | | | |
|---|---|---|---|
| I | PSMIN(I) | PFUP(I) | PFDWN(I) |
| 1 | 0.414 | 0.306 | 1 |
| 2 | 0.377 | 0.274 | 0.612 |
| 3 | 0.361 | 0.261 | 0.549 |
| 4 | 0.354 | 0.256 | 0.523 |
| 5 | 0.350 | 0.0 | 0.510 |

Note that PFDWN(I) has been set to one to indicate that I cannot be decreased below one, which corresponds to K=2. Further, PFUP(5) has been set to zero since I cannot be increased beyond 5, which corresponds to K=32. The basic rule that is embedded in the estimation method is to use a large K corresponding to a small p in situations where the estimator has little reliable information. For example, if NSUC is zero for several frames this could be due to two situations: 1) there are no active remote stations, or 2) there are many active remote stations, but they are all colliding due to the use of too large a p value. Since the estimation method sets NFRSTS equal to zero in this situation, it is implicitly assuming that case 2 is the cause of NSUC being zero. This is the preferred behavior, since it is better to overestimate rather than underestimate the number of active remote stations. Similarly, if there are many errors due to the radio media, the K estimation method will tend to overestimate the number of active remote stations. Again, given the lack of information, this is the preferred behavior.

Bernoulli Random Variable Generator

Computationally efficient mechanisms are described below for generating Bernoulli random variables given a value of p. A Bernoulli random variable is 1 with probability p and 0 otherwise. The scheme used in this invention achieves computational simplicity by restricting the values of p to certain discrete values. A stream of random bits is generated in which the values 0 and 1 appear with equal probability. There are several known ways to approximately generate such a stream of random bits.

In the approach of this invention, as shown in FIG. 11, a shift register 301 with a linear feedback mechanism is used (see block 301 of FIG. 11). During each clock cycle of the shift register, the binary sum of the indicated register bits is computed as shown by the summation points 300 and shifted into the register 301 as indicated by the arrows. The bits in the various positions of the shift register are readable for use as an address in the look-up table 302. In this example, the taps on the shift register correspond to the use of a primitive polynomial that achieves a maximal length sequence from the shift register. In the example shown in FIG. 12, the polynomial, $y8+y4+y3+y2+y+1$ is used. In this case, the shift register sequence does not repeat for $28-1$ or 255 clock cycles. Longer shift register lengths may be used to generate longer length sequences. When the shift register is initialized, at least one non-zero value must be loaded into a bit of the register. To prevent stations that have been started simultaneously from generating the same sequence of random bits, the shift registers of different stations can be initialized with a value that is derived from its unique equipment identification tag (e.g., the 48-bit MAC address used in the IEEE 802 standards). Two mechanisms that use the aforementioned random bit stream for generating Bernoulli random variables are described. In the first mechanism of FIG. 11 table 302 takes i bits from the shift register 301 and can thus generate Bernoulli random variables for $p=j/2**i$, where $j=1, 2, \ldots, 2i-1$. For example, with i=5, the look-up table method can generate Bernoulli random variables for $p=1/32, 2/32, \ldots, 31/32$. An example is shown for generating the transmit signal for a p value of 5/32, which is indicated at signal line 303. In the table in block 302, the five-bit address value is determined by the five binary signals X1, X2, X3, X4, and X5 that are obtained from the shift register 301. For each address value, the stored binary value that is used to generate the signal on line 303 is shown. Only five of the 32 equally-likely addresses are set to one to generate the transmit signal for a p value of 5/32. Note that the shift register 301 must be shifted by i bits for each Bernoulli random variable that is generated. Even greater computational simplicity can be achieved with a smaller set of p values as shown in the following mechanism. In the second mechanism of FIG. 12, a Bernoulli random variable is generated for $p=(1/2)m$ with integer m, by using a logical AND operation such as gate 352 on m bits from the random bit stream. For the case that was considered in the K estimation method, m values of 1, 2, 3, 4, and 5 were used. Thus, for each C period slot, the shift register needs to be clocked by m bits (up to five).

We claim:

1. A digital communication system comprising:

a plurality of remote stations, each including a transceiver for communication over a shared medium;

a base station having a transceiver for communication over said shared medium with the transceivers of each of said plurality of remote stations, said base station including:

a means for defining a sequence of time frames during which messages and data are transmitted over said shared medium, each said time frame being divided into at least three types of time slots, a first type A time slot for outbound transmission from said base station to said plurality of remote stations, a second type B time slot for contention free inbound transmission from said plurality of remote stations to said base station and a third type C time slot for contention access by said plurality of remote stations for transmission over said shared medium said defining means further including a means responsive to traffic load on said shared medium for allocating in a given time frame a variable number of said type A, type B and type C slots; and a means for interleaving within said given time frame groups of consecutive slots of the same type.

2. The system of claim 1 wherein each transceiver includes a frequency hopping radio signaling means and wherein said shared medium is a wireless radio frequency channel.

3. The system of claim 2 wherein said means for defining a sequence of time frames includes a means for spreading said given time frame over one or more frequency hopping periods.

4. The system of claim 3 wherein said interleaving means includes a means for inserting in said given time frame a frequency hopping type time slot.

5. The system of claim 4 wherein said interleaving means inserts at least one type C slot after each group of type A and type B slots.

6. The system of claim 5 wherein said means for interleaving within said time frame includes inserting at least one type C slot at the end of said given time frame.

7. The system of claim 6 wherein said means for allocating said time slots further comprises an outbound queue for queuing outbound transmission requests and an inbound queue for queuing inbound transmission requests;

dequeue means which, in response to said interleaving means, dequeues one or more pending requests from either said outbound queue or said inbound queue; and means responsive to said dequeuing means for assigning a given period in said time frame to said one or more pending requests, said given period being type A for outbound transmission requests and type B for inbound transmissions requests.

8. The system of claim 7 wherein said interleaving means causes said dequeuing means to alternatively dequeue one or more pending requests from respectively said outbound queue and said inbound queue.

9. The system of claim 8 wherein said interleaving means causes said dequeueing means to dequeue in sequence one or more pending requests from said outbound queue, respectively inbound queue, if said inbound queue, respectively said outbound queue is empty, until the duration of said given periods exceeds a predetermined value.

10. The system of claim 9 wherein said interleaving means causes said assigning means to insert a type C period between two consecutive said given periods.

11. The system of claim 10 wherein said interleaving means limits the total number of successive type A, B and C periods in each said time frame to a predetermined value.

12. The system of claim 11 wherein said base station includes a control indicia in a transmission from said base station to a given remote station that is indicative of the probability of said given remote station gaining access during said type C slots.

13. The system of claim 12 including means for providing an indication in a transmission from each said remote station to said base station of whether a given transmission of data is a retransmission.

14. The system of claim 13 including means for computing said control indicia as a function of said indications in transmissions from each said remote station over one or more said time frames.

15. The system of claim 14 wherein said means for computing said control indicia include means for recomputing said control indicia from one time frame to the next.

16. The system of claim 14 wherein said means for computing said control indicia include means for computing said indicia as a function of an estimate of the number of said remote stations contending for access.

17. The system of claim 16 wherein said means for computing said control indicia include means for computing said control indicia as a function of the ratio of the number of C slots in which a successful transmission from one of said remote stations occurs, relative to the total number of C slots.

18. The system of claim 16 wherein said means for computing said control indicia include means for computing said control indicia as a function of the ratio of the number of C slots in which said remote stations succeeded on a first attempt to transmit to said base station relative to the total number of remote stations that succeeded in an attempt to transmit to said base station.

19. The system of claim 18 wherein said type C slots are dedicated to contention access by said plurality of remote stations for inbound transmission to said base station.

20. A medium access control method in a digital communication system of the type comprising a plurality of remote stations, each including a transceiver for communication over a shared medium and a base station having a transceiver for communication over said shared medium with the transceivers of each of said plurality of remote stations, said method comprising the steps of:

defining a sequence of time frames during which messages and data are transmitted over said shared medium, each said time frame being divided into at least three types of time slots, a type A time slot for outbound transmission from said base station to said plurality of remote stations, a type B time slots for contention free inbound transmission from said plurality of remote stations to said base station and a type C time slots for contention access by said plurality of remote stations for transmission over said shared medium;

allocating in a given time frame a variable number of said type A, type B and type C slots; and interleaving within said given time frame groups of consecutive slots of the same type.

21. The method of claim 20 wherein said base station's and said remote stations' transceivers use frequency hopping radio signaling with said shared medium being a radio frequency channel and wherein said method includes the step of:

spreading said given time frame over one or more frequency hopping periods.

22. The method of claim 21 further comprising the step of:

inserting in said given time frame a frequency hopping type time slot.

23. The method of claim 20 wherein the step of interleaving includes inserting at least one type C slot after each group of type A slots and each group of type B slots.

24. The method of claim 23 wherein the step of interleaving type A, type B and type C periods within said time frame includes inserting a type C period at the end of said given time frame.

25. The method claim 24 wherein said step of allocating said time slots comprises the steps of:

queuing outbound transmission requests in a first queue and queuing inbound transmission requests in a second queue;

dequeuing one or more pending requests from either said first queue or said second queue; and assigning a given period in said time frame to said one or more pending requests, said given period being type A for outbound transmission requests and type B for inbound transmissions requests.

26. The method of claim 25 wherein said dequeuing step includes alternatively dequeuing one or more pending requests from respectively said first queue and said second queue in sequence.

27. The method of claim 25 wherein said dequeuing step includes dequeuing in sequence one or more pending requests from said first queue, respectively said second queue, if said second queue, respectively said first queue is empty, until the duration of said given periods exceeds a predetermined value.

28. The method of claim 27 wherein said interleaving step includes limiting the total number of successive type A, B and C periods in each said time frame to a predetermined value.

29. The method of claim 20 further including the step of including control indicia in a transmission from said base station to a given remote station that is indicative of the probability of said given remote station gaining access during said type C slots.

30. The method of claim 29 further including the steps of:

providing an indication in a transmission from each said remote station to said base station of whether a given transmission of data is a retransmission; and computing said control indicia as a function of said indications in transmissions from each said remote station over one or more said time frames.

31. The method of claim 30 wherein said step of computing said control indicia is performed for each time frame.

32. The method of claim 31 wherein said step of computing said control includes computing said indicia as a function of an estimate of the number of said remote stations contending for access.

33. The method of claim 32 wherein said step of computing said control indicia include computing said control indicia as a function of the ratio of the number of C slots in which a successful transmission from one of said remote stations occurs, relative to the total number of C slots.

34. The method of claim 33 wherein said step of computing said control indicia includes computing said control indicia as a function of the ratio of the number of C slots in which said remote stations succeeded on a first attempt to transmit to said base station relative to the total number of remote stations that succeeded in an attempt to transmit to said base station.

35. The method of claim 20 wherein said type C slots are dedicated to contention access by said plurality of remote stations for inbound transmission to said base station.

* * * * *